United States Patent
Bonnerup

(10) Patent No.: US 7,718,056 B2
(45) Date of Patent: May 18, 2010

(54) SEPARATOR FOR REMOVING IMPURITIES, ESPECIALLY SMALLER PARTICLES FROM RAIN WATER

(76) Inventor: Arne Bonnerup, Münstervej 2A, DK-5500 Middelfart (DK)

( * ) Notice: Subject to any disclaimer, the term of this patent is extended or adjusted under 35 U.S.C. 154(b) by 2 days.

(21) Appl. No.: 12/084,036

(22) PCT Filed: Oct. 24, 2006

(86) PCT No.: PCT/DK2006/000594

§ 371 (c)(1),
(2), (4) Date: Apr. 24, 2008

(87) PCT Pub. No.: WO2007/048411

PCT Pub. Date: May 3, 2007

(65) Prior Publication Data

US 2009/0078630 A1    Mar. 26, 2009

(30) Foreign Application Priority Data

Oct. 24, 2005   (DK) .............................. 2005 01478

(51) Int. Cl.
*B01D 36/04* (2006.01)
(52) U.S. Cl. ........... 210/170.03; 210/298; 210/305; 210/488; 210/521; 210/532.1
(58) Field of Classification Search .......... 210/170.03, 210/196, 265, 298, 299, 305, 312, 488, 521, 210/522, 523, 532.1, 540
See application file for complete search history.

(56) References Cited

U.S. PATENT DOCUMENTS

| | | | | |
|---|---|---|---|---|
| 3,545,619 A | * | 12/1970 | Ettlich et al. ................. | 210/196 |
| 3,640,387 A | * | 2/1972 | Conley et al. ............... | 210/521 |
| 3,975,276 A | * | 8/1976 | Schmid ........................ | 210/521 |
| 4,634,525 A | * | 1/1987 | Yant ............................. | 210/488 |
| 4,710,295 A | * | 12/1987 | Zabel .......................... | 210/488 |
| 4,957,628 A | * | 9/1990 | Schulz ........................ | 210/521 |
| 5,236,585 A | * | 8/1993 | Fink ............................ | 210/521 |
| 5,543,064 A | * | 8/1996 | Batten ......................... | 210/523 |
| 6,261,446 B1 | * | 7/2001 | Cornick ...................... | 210/523 |
| 6,524,473 B2 | * | 2/2003 | Williamson ............. | 210/170.03 |
| 6,676,832 B2 | * | 1/2004 | de Bruijn et al. ........ | 210/170.03 |
| 2004/0159606 A1 | * | 8/2004 | Thacker et al. ............. | 210/521 |
| 2006/0157428 A1 | * | 7/2006 | Brody .......................... | 210/521 |
| 2009/0101555 A1 | * | 4/2009 | Scarpine et al. ......... | 210/170.03 |

* cited by examiner

FOREIGN PATENT DOCUMENTS

FR       2 729 168 A1      7/1996

*Primary Examiner*—Christopher Upton
(74) *Attorney, Agent, or Firm*—The Nath Law Group; Jerald L. Meyer; Stanley N. Protigal

(57) ABSTRACT

Separator for removing impurities, especially smaller particles, from rain water. It comprises a first reservoir (2) and a second reservoir (6). The first reservoir (2) performs the function of removing the heaviest portions of the impurities, but is also provided with a lamellar device (4), wherein small drops and impurities of the rain water may be combined to larger impurity aggregates. The second reservoir (6) is divided into a first chamber (6a) and a second chamber (6b), said chambers communicating with each other. A tube (5) provided with perforations (5') is arranged above the lamellar device (4), through which rain water containing impurities is able to flow from the first reservoir (2) and into the first chamber (6a). The first chamber (6a) is provided with a filter (9). In this way, a more efficient purification of rain water than using the known separator is provided.

19 Claims, 2 Drawing Sheets

SEPARATOR FOR REMOVING IMPURITIES, ESPECIALLY SMALLER PARTICLES FROM RAIN WATER

TECHNICAL FIELD

The invention relates to a separator for removing impurities, especially smaller particles, from rain water, said separator comprising a first reservoir having an inflow and a second reservoir having an outflow, and where the first reservoir performs the function of removing big size impurities, a lamellar device being provided in the first reservoir wherein small amounts of impurities in the rain may be combined with a major amount of impurities, whereby the second reservoir is divided into a first chamber and a second chamber, said chambers communicating with each other, the first chamber being provided with a filter.

BACKGROUND ART

U.S. Pat. No. 3,545,619 relates to a water treatment plant comprising a separator. This separator has a first reservoir with an inlet and a second reservoir with an outlet. The first reservoir is a settling reservoir for separation of major impurities and comprises a settling device consisting of inclined tubes. The second reservoir is divided into a first portion containing a filter and a second portion containing a dewatering device. The two portions of the reservoir communicate with each other. The filter is placed at the transfer from the first portion to the second portion. A perforated pipe leads rain water from the first reservoir to the second reservoir. This plant is not very compact.

French patent publication No 2729168 relates to an assembly for rain water recovery and recycling. It discloses a separator for removing impurities, especially smaller particles, from rain water. The separator comprises a first reservoir having an inflow and a second reservoir having an outflow; the first reservoir performs the function of removing the heaviest portions of the impurities. These particles fall onto the bottom of the first reservoir due to gravity. At least part of them stay in the second reservoir because of a filter located over the bottom of the first reservoir; the second reservoir is divided into a first chamber and a second chamber, said chambers communicating with each other and the first chamber being provided with a filter. This assembly is rather complicated and the filtering qualities not quite satisfactory.

The object of the invention is to provide a separator structure which is more compact than the known separators and which has better filtering qualities.

DISCLOSURE OF INVENTION

The separator according to the invention is characterized in that a tube provided with perforations is arranged above the lamellar device, through which rain water containing impurities is able to flow from the first reservoir and into the first chamber, and that the filter is made of polyvinylchloride or polyethylene and optionally is multi layered, and that the plates of the filter are profiled and that the distance between the individual filter plates is 0.5-30 mm, preferably 5-10 mm. In this way, a more efficient filtering of rain water than previously known is achieved and the separator is more compact than known. The separator stops particles—both big ones and little ones. The tube provided with perforations ensures that water flows evenly through the lamellar device.

That is because after having passed the lamellar device the water passes from outside the pipe—through the perforations and into the pipe—and then axially out through one end of the pipe. After ending of a rainfall, the filter is flushed empty; the particles having settled thereon are flushed free and pumped back to the first reservoir. Therefrom the flushing water containing the smaller particles together with water containing sludge, big particles etc. is led to a sewer and on to an actual water purification plant. When the first reservoir is empty, the evacuation thereof stops.

According to the invention, the filter may be arranged at the transition between the first chamber and the second chamber. This permits a particularly effective usage of space.

Moreover, according to the invention, the filter may be adapted so as to be easily replaceable, thus making the separator more efficient, since it is easier to service.

According to the invention, the filter may be arranged pre-dominantly horizontally and may for example consist of filter plates arranged predominantly obliquely and in series. Thus, the filter is particularly easily accessible and thus comparatively easily maintained.

Moreover, according to the invention, the plates of the filter may be arranged vertically, which has been found to provide a particularly efficient purification of the water passing through the separator.

Additionally, according to the invention, a pump may be installed in the second chamber, the pressure side of said pump being connected to an outflow pipe provided with spray openings, said outflow pipe leading into the first reservoir through at least one wall. This ensures, that the separator can be cleaned after every rainfall from impurities and that thus impurities do not accumulate in the separator.

Further, according to the invention, a second pump may be installed in the first reservoir for evacuating rain water containing impurities from said first reservoir. In this way, if the amount of water to be purified in the separator per unit time becomes too large, some of the water to be purified can be pumped away from the separator immediately so that the latter is not overloaded.

Finally, according to the invention, the separator may be adapted such that impurities having settled therein can be removed automatically.

BRIEF DESCRIPTION OF THE DRAWING

The invention is explained in detail below with reference to the drawings, in which FIG. 1 schematically shows a longitudinal section through a first embodiment of the separator according to the invention, FIG. 2 schematically shows a cross-section through a filter consisting of obliquely arranged filter plates, FIG. 3 schematically shows a cross-section through a filter in which plates of the filter are profiled and arranged vertically, and FIG. 4 schematically shows a cross-section through a filter which is multilayered.

BEST MODES FOR CARRYING OUT THE INVENTION

Figure 1:
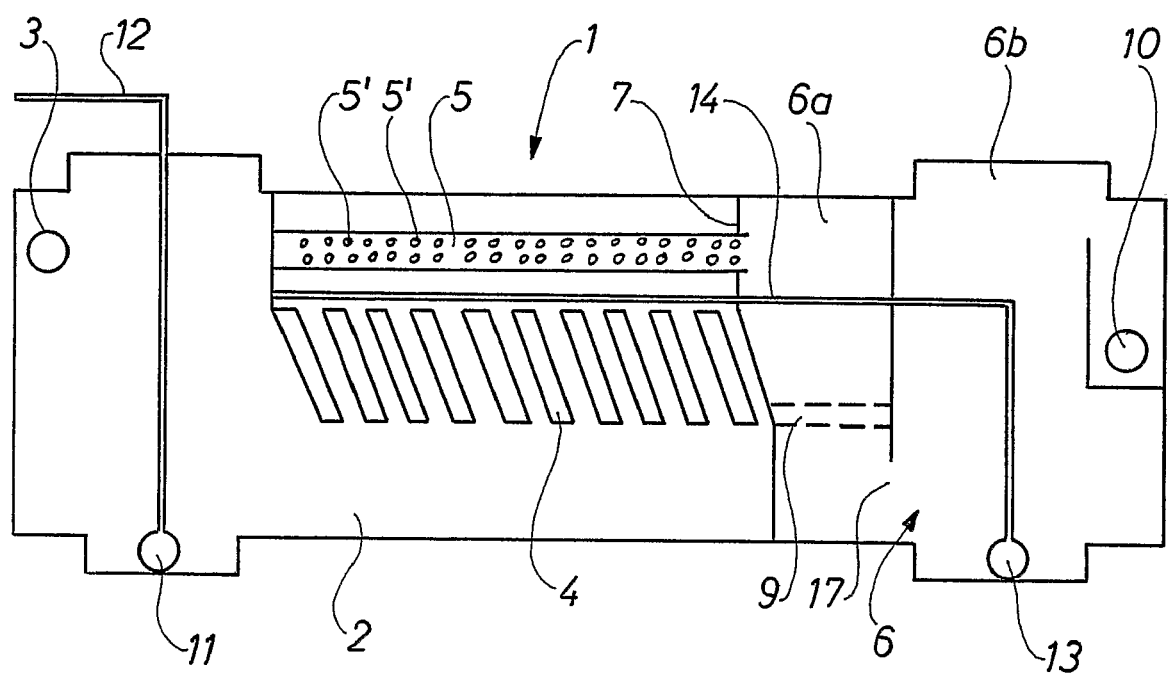

The separator 1 shown in FIG. 1, performing the function of removing impurities, especially lesser particles from rain water, comprises a first reservoir 2 provided with an inflow 3 and a second reservoir 6 provided with an outflow 10. The first reservoir 2 performs the function of removing the biggest granules of impurities. In this reservoir, there is installed a lamellar device 4, wherein small drops and impurities of the rain water passing through the separator may be combined to larger impurity aggregates. The second reservoir 6 is divided into a first chamber 6a and a second chamber 6b, said chambers communicating through an opening 17 with each other. A tube 5 provided with perforations 5' is arranged above the lamellar device 4, through which rain water containing impurities is able to flow into the first chamber 6a. The first chamber 6a is provided with a filter 9.

Optionally, the filter 9 may be arranged adjacent or close to the transition between the first chamber 6a and the second chamber 6b, as shown in FIG. 1.

Figure 2:
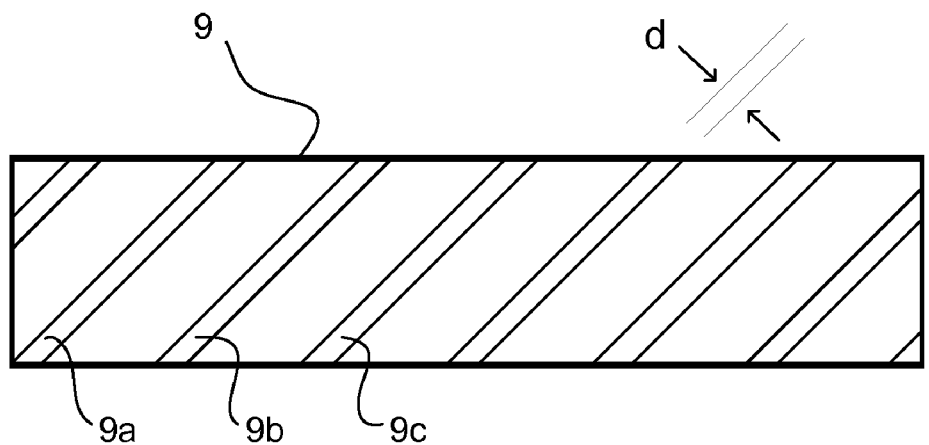

The filter 9 may be easily replaceable and arranged predominantly horizontally. As shown in FIG. 2, it may consist of filter plates 9a, 9b, 9c arranged predominantly obliquely and in series.

The filter 9 may be made of polyvinyl chloride or polyethylene and may optionally consist of several horizontal layers (not shown).

The plates of the filter 9 are profiled and arranged vertically (not shown either).

With reference to FIG. 2 it should be noted that the distance d between the individual filter plates 9a, 9b, 9c of the filter 9 may be 0.5-30 mm, preferably 5-10 mm.

Figure 3:
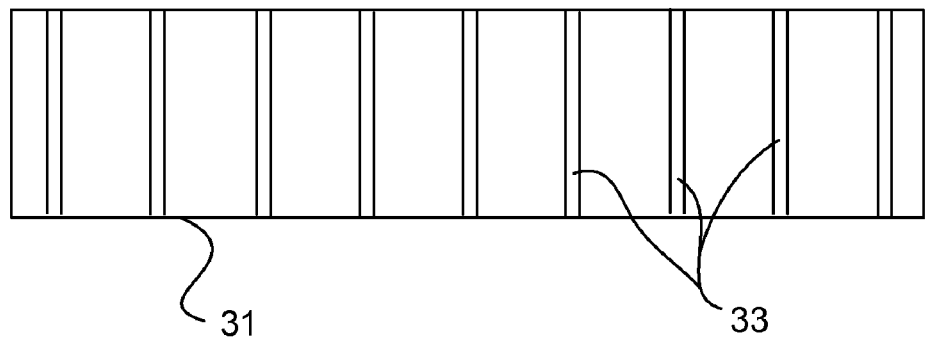
Figure 4:
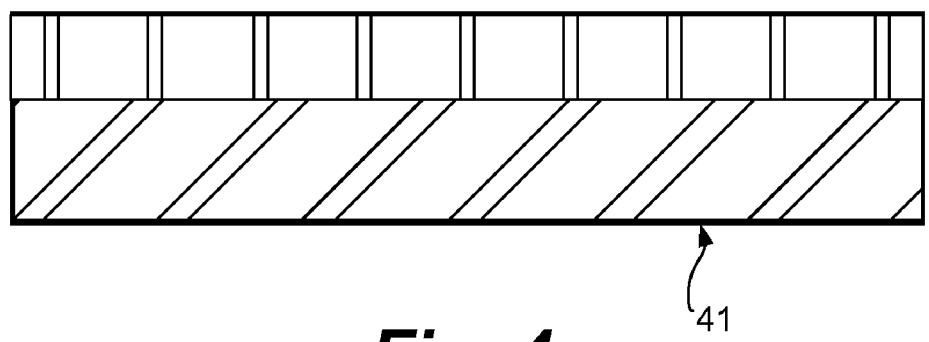

FIGS. 2 and 3 schematically show alternate filter configurations. FIG. 3 shows a filter 31 in which plates 33 of the filter 31 are profiled and arranged vertically. FIG. 4 shows a filter 41 which is multilayered.

A pump 13 may be installed in the second chamber 6b, the pressure side of said pump being connected to an outflow pipe 14 provided with spray openings (not shown), said outflow pipe leading into the first reservoir 2 through at least one wall 7. The wall 7 is the wall dividing reservoirs 2 and 6.

As shown in FIG. 1, a second pump 11 may be installed in the first reservoir 2 for reducing the amount of rain water containing impurities, however, such a pump is, naturally, not absolutely necessary. The pump may be installed outside of the separator in a pipe conduit leading to reservoir 2.

Optionally, the separator may be adapted such that impurities having settled therein can be removed automatically, and in particular it is possible that additional flushing means may be provided, e.g. close to the filter 9, said flushing means (e.g. flushing nozzles) being directable towards the plates of the filter 9. Optionally, special flushing means may also be provided in connection with the lamellar device 4.

The invention claimed is:

1. Separator for removing impurities, especially smaller particles, from rain water, said separator comprising a first reservoir having an inflow and a second reservoir having an outflow, and where the first reservoir performs the function of removing big size impurities, a lamellar device provided in the first reservoir, wherein small amounts of impurities in the rain water may be combined to a major amount of impurities, whereby the second reservoir is divided into a first chamber and a second chamber, said chambers separated by a vertical baffle communicating with each other beneath said baffle, the first chamber provided with a horizontally-arranged filter separating the first and second chambers, characterized in that a tube provided with perforations is arranged above the lamellar device, through which rain water containing impurities is able to flow from the first reservoir and into the first chamber and then exit the second chamber after having passed the filter.

2. Separator as claimed in claim 1, characterized in that the filter is arranged at the transition between the first chamber and the second chamber.

3. Separator as claimed in claim 1, characterized in that the filter is adapted so as to be easily replaceable.

4. Separator as claimed in claim 1, wherein the filter has a plate construction, with the plates arranged vertically.

5. Separator as claimed in claim 1, further comprising a first pump installed in the second chamber, the pressure side of said pump connected to an outflow pipe provided with spray openings, said outflow pipe leading into the first reservoir through at least one wall.

6. Separator as claimed in claim 5, further comprising a second pump installed in the first reservoir, for evacuating rain water containing impurities from said reservoir.

7. Separator as claimed in claim 1, wherein the filter has a plate construction, with the plates arranged vertically and comprising a material selected from at least one of polyvinyl chloride and polyethylene.

8. Separator as claimed in claim 7, wherein the filter has a filter plate construction, with a distance between individual filter plates in a range of 0.5-30 mm.

9. Separator as claimed in claim 8, wherein the filter has a filter plate construction, with a distance between individual filter plates in a range of 5-10 mm.

10. Separator as claimed in claim 7, wherein the filter has a filter plate construction, with the filter arranged predominantly horizontally, and with the filter plates arranged predominantly obliquely and in series.

11. Separator for removing impurities, especially smaller particles, from rain water, said separator comprising:
a first reservoir having an inflow, in which the first reservoir performs the function of removing big size impurities;
a second reservoir divided into a first chamber and a second chamber, said chambers separated by a vertical baffle communicating with each other beneath said baffle, and the second chamber having an outflow;
a lamellar device being provided in the first reservoir, the lamellar device causing small amounts of impurities in the rain water to collect;
a filter arranged at the transition between the first chamber and the second chamber; and
a tube with perforations arranged above the lamellar device, through which rain water containing impurities may flow from the first reservoir and into the first chamber, wherein
after having passed the lamellar device the water passes from the first reservoir to the second reservoir through the perforations, and after ending of a rainfall, flushing the filter results in flushing the particles from the filter and back to the first reservoir, permitting discharge of the flushing water containing the smaller particles.

12. Separator as claimed in claim 11, wherein the discharge of the water containing the impurities permits discharge to a sewer.

13. Separator as claimed in claim 11, wherein the filter has a plate construction, with the plates arranged vertically and comprising a material selected from at least one of polyvinyl chloride and polyethylene, the filter adapted for easy replacement.

14. Separator as claimed in claim 13, wherein the filter has a distance between individual filter plates in a range of 0.5-30 mm.

15. Separator as claimed in claim 13, wherein the filter has a distance between individual filter plates in a range of 5-10 mm.

16. Separator as claimed in claim 13, characterized in that, the filter has a predominantly horizontally position with the filter plates arranged predominantly obliquely and in series.

17. Separator as claimed in claim 11, wherein the filter has a predominantly horizontal position.

18. Separator as claimed in claim 11, further comprising a first pump installed in the second chamber, the pressure side of said pump connected to an outflow pipe provided with spray openings, said outflow pipe leading into the first reservoir through at least one wall.

19. Separator as claimed in claim 18, further comprising a second pump installed in the first reservoir, for evacuating rain water containing impurities from said reservoir.

* * * * *